United States Patent [19]

Offer

[11] Patent Number: 5,756,966
[45] Date of Patent: May 26, 1998

[54] METHOD FOR JOINING METAL COMPONENTS WITH IMPROVED ARC VOLTAGE SENSING AND CONTROL

[75] Inventor: Henry Peter Offer, Los Gatos, Calif.

[73] Assignee: General Electric Company, San Jose, Calif.

[21] Appl. No.: 532,191

[22] Filed: Sep. 22, 1995

[51] Int. Cl.$^6$ ........................................ B23K 9/09
[52] U.S. Cl. .............................. 219/124.03; 219/130.01; 219/130.51
[58] Field of Search ........................ 219/130.51, 123, 219/124.03, 130.01, 130.31, 136, 137 PS, 75

[56] References Cited

U.S. PATENT DOCUMENTS

| | | |
|---|---|---|
| 3,825,712 | 7/1974 | Gibbs ........................... 219/123 |
| 4,110,590 | 8/1978 | Batey et al. ................... 219/75 |
| 4,538,046 | 8/1985 | Kazlauskas .................. 219/124.03 |
| 4,617,444 | 10/1986 | Engelhard et al. ........... 219/136 |
| 4,758,707 | 7/1988 | Ogilvie et al. ............... 219/130.51 |
| 4,806,735 | 2/1989 | Ditschun et al. ............. 219/130.51 |
| 4,918,517 | 4/1990 | Burgoon ....................... 358/101 |
| 5,293,027 | 3/1994 | Strumpf ....................... 219/130.51 |
| 5,373,139 | 12/1994 | Burgoon et al. ............. 219/136 |

FOREIGN PATENT DOCUMENTS 0 387 223  9/1990  European Pat. Off. .

Primary Examiner—Clifford C. Shaw
Attorney, Agent, or Firm—James E. McGinness; Dennis M. Flaherty

[57] ABSTRACT

A method of arc voltage sensing and electrode position control during mechanized electric arc welding. This welding method utilizes a lower power mode of the arc which has an improved voltage sensing geometry, and allows welds to be reliably made between components having small weld joint widths. The arc voltage is sensed only during the lower power mode. The sensing step is performed at a sensing time which is delayed relative to the start of said low power period, the duration of the delay being sufficient to allow the weld pool produced during the high power period to partially solidify. This method improves the voltage stability and arc position of the welding process, preventing the problem of the arc "climbing" the side walls of the weld groove. During the low-power arc voltage sensing mode, the arc is narrower and therefore more focused on the preferred bead center sensing position of a weld pass rather than spread out onto the adjacent side walls.

11 Claims, 6 Drawing Sheets

METHOD FOR JOINING METAL COMPONENTS WITH IMPROVED ARC VOLTAGE SENSING AND CONTROL

FIELD OF THE INVENTION

This invention relates to the automated welding of metal components.

BACKGROUND OF THE INVENTION

In electric arc welding processes, one of the most common methods for maintaining a constant arc voltage is to electronically measure the voltage of the arc, and to correspondingly drive the axial position of the electrode in a direction generally perpendicular to the weld pool with a servo-controlled circuit so that the length of the arc (and therefore its electrical resistance) is held constant. This method is generally known as automatic voltage control (AVC). As the arc resistance is held constant, so is the voltage drop across the arc for a given welding current level, according to Ohm Law (i.e., V=IR, where V is voltage, I is current and R is resistance). The mechanized welding AVC method is used with either constant current or with pulsed current where the voltage is sensed during both the low- and the high-power period current levels.

Typical mechanized torch position, pulsed power welding systems have the potential to be equipped with AVC using a voltage sensing and electrode axial positioning servo controller. These subsystems are designed to provide a constant, preset value of arc voltage and corresponding arc length, but in turn are inherently prone to make the arc sensitive to "climbing" the side wall(s) when a portion of the arc attaches to the side wall.

"Climbing" refers to the problem in AVC welding systems occurring when the arc anode spot is inadvertently on a surface which has an acute angle to the electrode axis. [An anode spot is the location where the arc impinges on the workpiece and can, with sufficient electrical power, form a molten pool due to the electron heating of the arc.] This usually results in a reduction in arc length and a consequent decrease in arc voltage. In response to the decrease in arc voltage, the AVC servo controller will attempt to move the electrode along the electrode axis and away from the groove bottom to restore the preset arc voltage. In this condition, the arc does not respond controllably to the servo system's attempt to maintain a constant arc voltage with the arc properly impinging directly on the bottom of the groove, rather than on the side wall(s). In particular, in a case where the walls of a very narrow groove are nearly parallel, the AVC servo controller will tend to continually move the electrode upward approximately in parallel with the side wall, because the arc length does not increase as the result of this parallel movement. In pulsed current welding systems, arc "climbing" typically occurs during the high-power-mode welding periods where the arc attaches to both the main weld pool and the groove side wall(s). This condition is caused when the welding electrode is not well centered in a very narrow groove, or when the deposited filler metal does not wet across the joint uniformly, or when the welding electrode becomes too close to a side wall in a conventional narrow or wide groove, or to an electrically common surface of an adjacent metal component. Historically, arc "climbing" has been considered one of the greatest problems in welding high-volumetric-efficiency joints having very narrow grooves and/or steep side walls, and as a result, these more efficient geometry conditions have been avoided as unweldable.

The "climbing" problem is compounded since most existing arc voltage sensing systems measure the voltage when the arc is in its unfavorable high-power, large weld pool mode, which can force a portion of the resulting larger arc to spread up the adjacent side wall(s). The typical solutions to the "climbing" problem are to attempt to stabilize the position of the arc by periodically translating or pivoting the tip of the electrode away from the wall using an electrode oscillation (for straight electrodes) or rotation motion (for offset tip electrodes), or to maintain improved electrode, arc and weld pool centering, or to widen the joint and fix the electrode position further away from the wall. Another common method, which is more prone to causing lack-of-fusion defects at the wall(s), is to "steer" and maintain a position further away from the nearest groove wall.

The conventional AVC method does not measure voltage only during the low-power, minimum weld pool size periods, with the arc length held constant (also known as "locked") at the previous low-power period sensed value during the subsequent high-power period. The weld pool size is minimum at the end of the low-power period, after it has diminished from its maximum size at the end of the high-power period, primarily by conductive cooling. Conventional AVC systems are simplistically designed to sense and control arc length throughout the full pulsed power levels, rather than selectively at the optimum final part of the power level, and for the preferred low-power level only.

All known AVC-equipped arc welding systems have a voltage sense period that is triggered near the ends of and is equal to the duration of the current/voltage pulse. No sense period delays beyond the beginning of the secondary period (other than extremely short delays incorporated to provide time for the circuit electronics to stabilize), or extensions into the subsequent primary power period, are possible with known AVC circuit designs. These limitations on the design and performance of conventional welding equipment prevent utilization of the favorable condition of the arc and weld pool, which is when both have diminished to their minimum secondary power level size some finite time after the end of the primary period.

Other system designs are based on maintaining constant arc length by mechanical, optical, sonar, and eddy-current means, such as cam-type followers, lasers, etc. However, these designs do not accurately control the arc length since the followers must be located some distance away from the weld pool, or even be in contact with the work completely outside of the weld joint. These systems do not control the arc voltage well either, since the voltage is a function of the current, which may be programmed to change between low and high values as is practiced in pulsed current welding, and the corresponding changes in the weld pool are not detected by systems sensing other than the arc itself. Some of these systems use a time delay for approximate arc length control when the work surface height sensor is placed ahead of the weld pool for different reasons such as available space. In these cases, the time delay only compensates for the forward position of the sensor, and is not related to the secondary period weld pool geometry.

During very-narrow-groove welding without lateral arc oscillation, while the current is at the high level, the arc preferably forms an anode spot on both walls simultaneously, as is required to obtain adequate side wall fusion when only one weld pass is deposited per layer. However, if the voltage is sensed while a portion of the anode spot is on the side walls, the arc has an undesired sensitivity to favor attaching to the nearest side wall. Various techniques exist to manipulate the non-consumable (GTA and plasma transferred arc welding) or consumable electrode (metal inert gas and submerged arc welding) laterally so as to cause the arc to alternately form its anode spot on one and then the other side wall, as well as the weld pool. The net effect of the manipulation is the heating and fusing of the weld pool to both walls in a nearly simultaneous manner, while avoiding "climbing". The limiting feature of these techniques is that the groove width must necessarily be maintained broader than if no lateral manipulation were required to alternately heat both side walls, without occurrence of the arc "climbing" problem.

While prior art AVC techniques do not work with extremely narrow welding grooves for the reasons stated above, the use of very narrow grooves is highly desirable for the following reasons.

Stress corrosion cracking (SCC) has led to the critical need for repair or replacement of many reactor components and piping throughout the world. Welded joints have historically been the areas most likely to fail due to SCC because of their typically high values of tensile residual stress and their high degree of thermal sensitization in the HAZ. One solution to this problem is to replace components with new material having improvements in chemical composition. Due to the exceedingly high cost of replacing some components such as the core shroud, the replacement must be durable. Replacements are generally an installation of newer SCC-resistant material joined to older, SCC-susceptible material, so it is highly desirable even for these cases that the joining process improve the residual stress and microstructural conditions in the older material, since the relatively low thermal efficiency of conventional joining practices has often been one of the direct causes of the old component's failure.

Thus, there is a need for a mechanized welding process which will produce weld joints having very significantly improved SCC resistance. This can be accomplished using joint designs with deep but very narrow groove widths to minimize the amount of heat put into the weld material, thereby reducing the tensile residual stresses in the vicinity of the weld joint. Another benefit is an improvement in the SCC resistance of the microstructure of the heat affected zones (HAZ) adjacent to the weld.

One key application of such a welding method is the replacement weld between a boiling water reactor (BWR) core shroud and its attachment ledge, or alternatively, an assembly or repair weld between adjacent portions of the shroud or between other components which require rejoining due to the shroud repairs or other reactor internals repair/replacement. In either case, one or both sides of these joints may consist of material which, by virtue of its composition, is inherently susceptible to SCC. These welds may be made either during new shroud installation or after plant operation during shroud replacement. Applications other than in the vessel include the various plant piping system welds, as well as heavy section structural welds.

In addition, there is a need for a welding method which decreases the welding time, and the corresponding man-rem personnel radiation exposure and production costs, associated with work on a "critical path" of an operating power plant. Conventional welding practices, including those used for field work, have relatively low thermal efficiency since a large portion of the heat goes into melting the required volume of filler wire, rather than into fusing the walls of the joint together. This condition is a direct result of the unnecessarily wide joints used. In contrast, the use of very narrow welding grooves improves productivity due to the higher thermal and volumetric efficiencies of this new method, resulting primarily from the reduced heat input parameters and the reduced-width joint design, respectively. The basic gas tungsten arc (GTA) welding process is generally rated as the best electric arc-based process for high weld quality, but only at an intermediate level of productivity. Other complicating variations of the GTA process, such as hot wire feed, have improved productivity with only limited success. Thus, there is a need for an improved AVC system which would allow the GTA process, utilizing simple cold wire feed, to be rated as a method with both high quality and high productivity.

SUMMARY OF THE INVENTION

The present invention is an electric arc welding voltage measurement and electrode positioning method which allows the width and side wall angle of a joint to be significantly reduced to values which would otherwise be unstable in conventional groove welding. This unique method of arc voltage sensing and electrode position control during mechanized electric arc welding utilizes a lower power mode of the arc which has an improved voltage sensing geometry, and allows welds to be reliably made between components having weld joint widths which are significantly less than have ever been produced by any other arc welding process. This method greatly improves the voltage stability and arc position of the welding process, preventing the problem of the arc "climbing" the side walls of the weld groove.

The welding method described herein eliminates arc "climbing" by sensing the arc voltage during a low-power, small-weld-pool mode, when the anode spot and arc are smaller and therefore not prone to attach to the side wall(s). During the preferred low-power arc voltage sensing mode disclosed herein, the arc is narrower and therefore more focused on the preferred bead center sensing position of a weld pass rather than spread out onto the adjacent side walls.

Sensing voltage at the very minimum weld pool size provides the greatest resistance to arc "climbing" of joint side walls, and is a significant and unique advantage of the welding method in accordance with the present invention. In contrast to conventional AVC systems which sense the arc voltage during the high-power (primary) pulse period, the present invention utilizes the favorable condition of the arc and weld pool, which is when both have diminished to their minimum secondary power level size some finite time after the end of the primary period. The length of this delay time depends on the actual welding conditions programmed, and is sensitive to certain parameters, including the weld current/voltage pulse levels and pulse durations, and various other parameters, all of which determine how fast the weld arc and pool become stable after the start of the secondary period. The arc size can respond faster than the weld pool size after a current decrease, but the anode spot size and position are a function of the pool size and shape at a given current level, causing the pool surface geometry to be the limiting condition for establishing a stable arc size after a current decrease. In particular, the arc has a preference for attaching to a liquid as opposed to a solid. The incorporation of a sensing period delay becomes more important as the torch travel speed is increased, and the corresponding pulse periods are programmed to reduced values (or the pulse frequency is increased, depending on the available timing mode of the machine). As the secondary pulse period is reduced to very short times, the secondary voltage sense time approaches zero, so the secondary voltage control time may become insufficient to result in full arc length response. This condition is addressed by continuing the secondary control period beyond the secondary sense period into the primary pulse period, which is effective in the welding method of the present invention since the primary period is not utilized for either primary voltage sensing or control (the arc length is otherwise locked). Various methods are disclosed to enable the arc to be controlled during a low-power mode (with low voltage, low current, or both; and with sensing time delays, control time extensions, or both, etc.).

One of the most significant features of this method is that it enables extremely narrow welds to be made with improved arc position stability relative to all other competing processes (despite the narrower joint design). The reduced groove width and angle allowed by use of this voltage sensing and electrode position control method in turn provides the additional technical benefits of reduced total heat input and corresponding thermal damage, including potential for sensitization, distortion, and residual stress in the completed joint. The commercial benefits of the method include improved production efficiency due to the lower volume of weld metal needed to fill a joint, as well as enhanced operator usability due to a reduction in torch lateral steering sensitivity and elimination of tedious bead placement near side walls.

DETAILED DESCRIPTION OF THE PREFERRED EMBODIMENTS

In accordance with the novel welding method of arc voltage sensing and control disclosed herein, no relative lateral movement between the electrode and the side walls is required, the current is preferably pulsed between two levels, and the voltage is sensed only on the lower value of current. The lower level of current is preset low enough so that the width of the arc is reduced as necessary, ensuring that the anode spot is not on the side wall(s), and therefore that the electrode and arc are not sensitive to being off-center in the groove. The higher level of current is adjusted to provide the heat required to produce a sound weld deposit, with the filler metal addition fully fused to the side walls, and accommodates the general welding heat sink conditions of the joint. The key result of this voltage sensing method is that the joint-width limiting feature of the various manipulated arc welding techniques is eliminated, and the joint width may be reduced significantly further. The conventional manipulation mechanisms that are typically required to get the weld pool to fuse to the side wall(s), such as oscillating or rotating offset nonconsumable electrodes and pre-bent or twisted consumable electrodes, then become unnecessary and can be eliminated in order to simplify and improve the reliability of the welding system.

Figure 1:
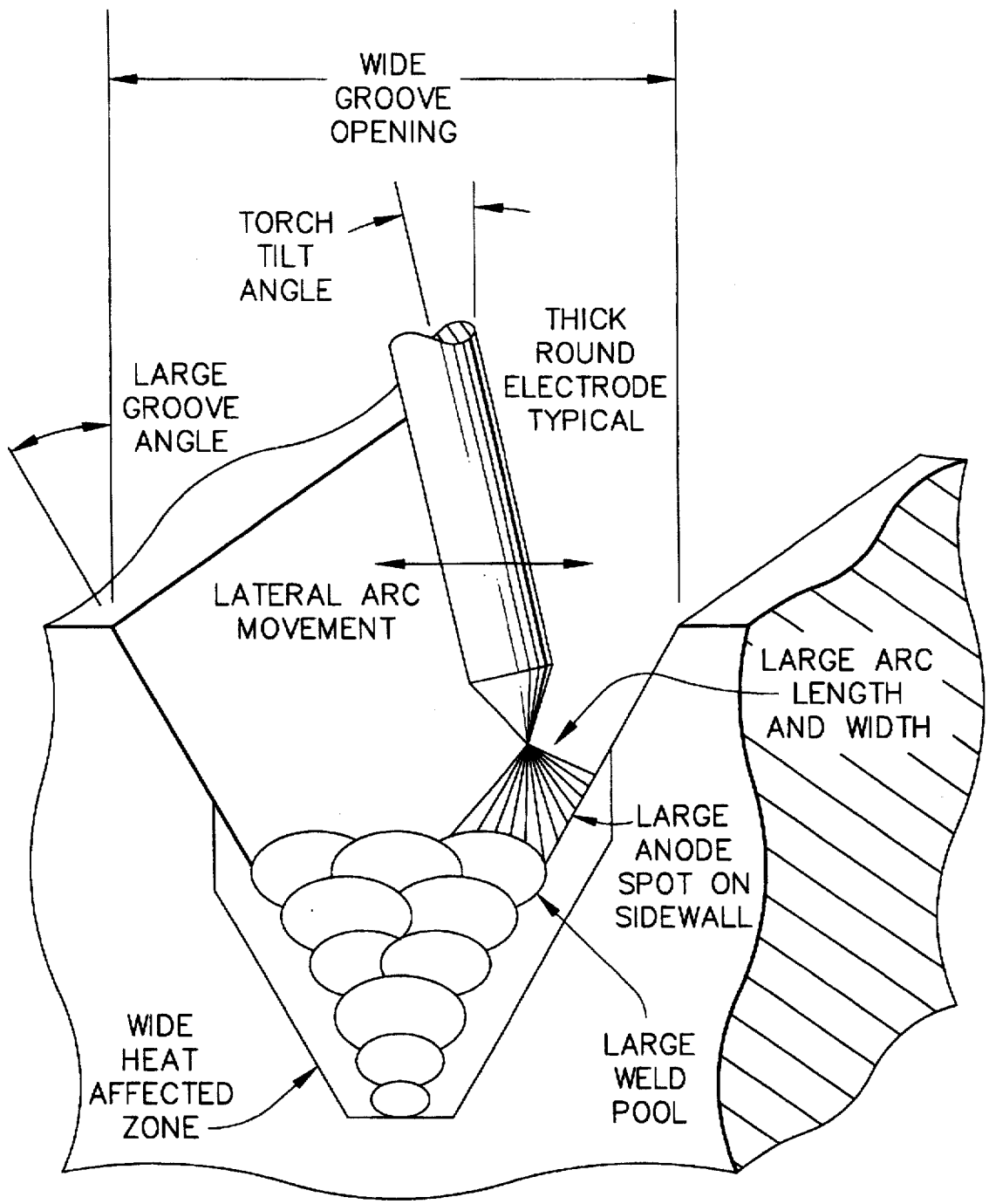
FIG. 1 is a cross-sectional schematic of a conventional groove welding geometry, showing electrode manipulation, large arc morphology and anode spot position on the side wall during primary mode voltage sensing in accordance with the prior art.
Figure 2:
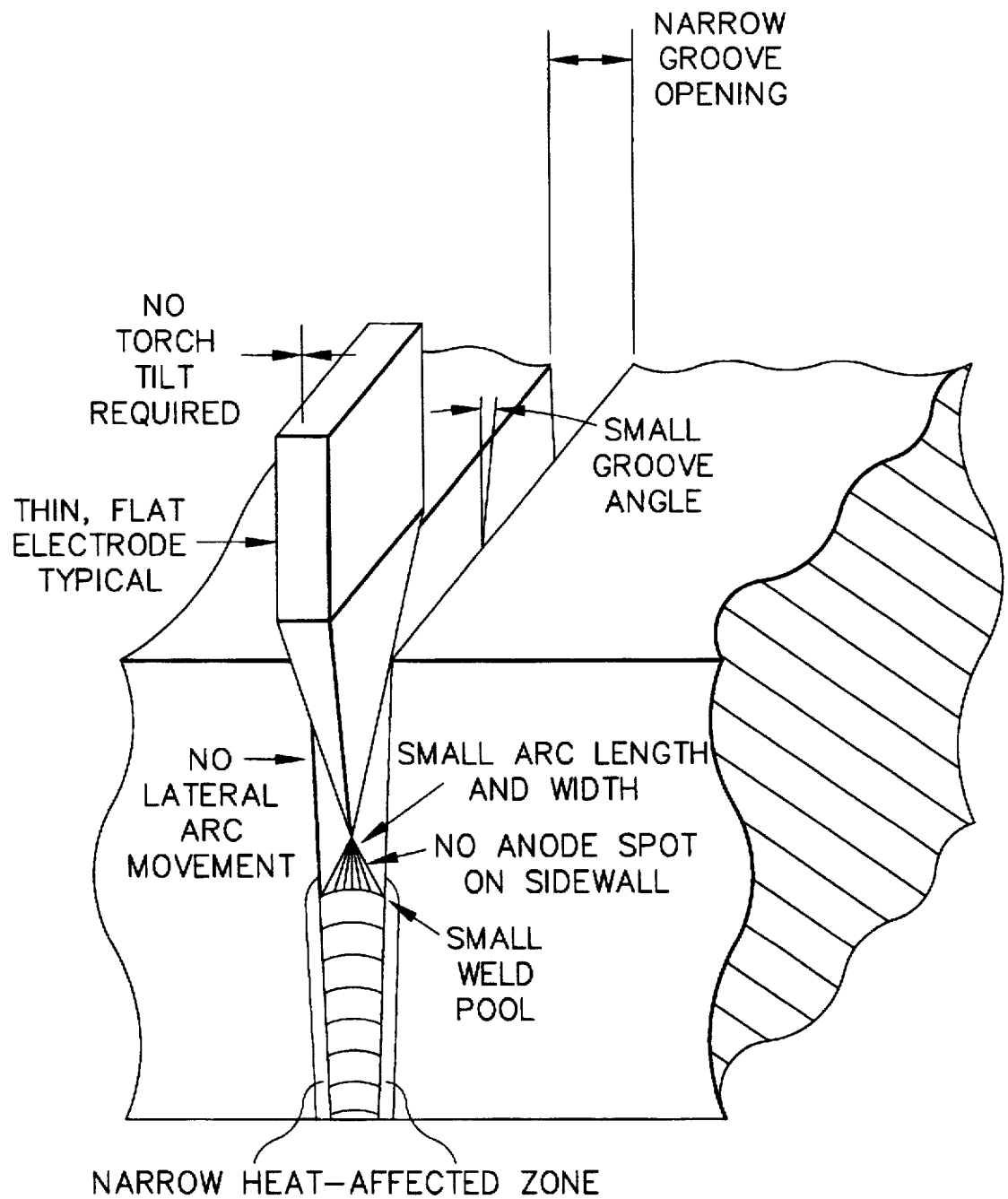
FIG. 2 is a cross-sectional schematic of a reduced-width groove welding geometry, showing a non-manipulated electrode, small arc morphology and anode spot position off of the side wall during secondary mode voltage sensing in accordance with the present invention.

The significant features of the gas tungsten arc (GTA) welding process with mechanized torch movement are shown schematically in FIG. 1 for conventional pulsed-power groove welding, using existing industrial arc voltage control practice. The corresponding features of the voltage sensing and control method of the present invention, as uniquely applied to a very-narrow-groove weld, are shown in FIG. 2. Comparison of FIGS. 1 and 2 demonstrates that even though the very-narrow-groove weld would be prone to arc "climbing" if attempted with conventional practices, the welding method of the present invention permits this thermally and volumetrically efficient type of weld configuration to be easily completed with even less tendency for arc "climbing" than the conventional design.

Figure 4:
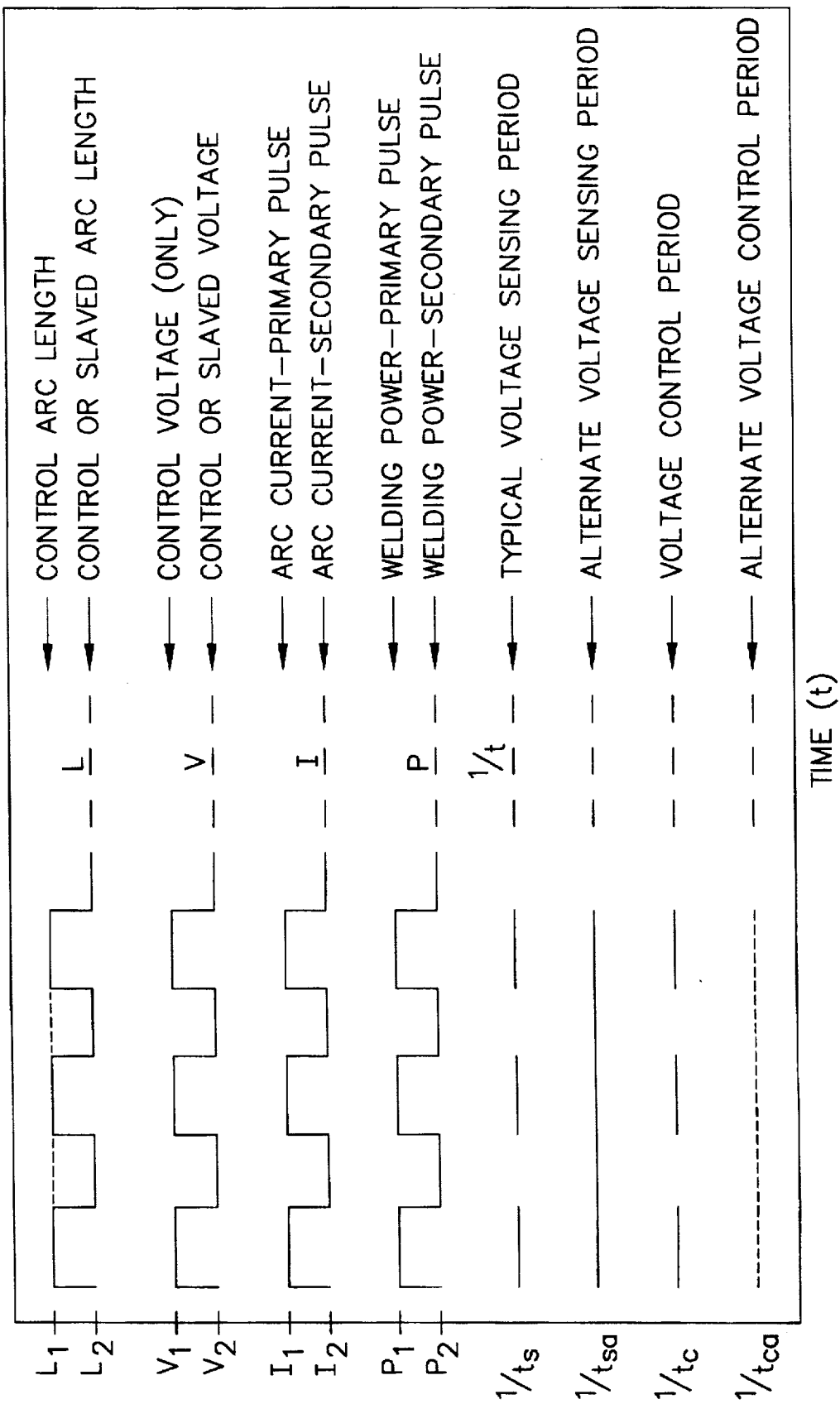
FIG. 4 is a timing diagram showing basic pulsed welding parameter sequences for conventional welding voltage control, wherein L is arc length; V is arc voltage; I is arc current, P is welding power, 1/t are arbitrary scales for the sensing/control period, and the subscripts 1, 2, S, C and A respectively denote Primary, Secondary, Sensing, Control and Alternate.

The pulsed-power time sequence for the electrical parameters typical of conventional arc welding are shown in FIG. 4, and indicate the difference in the periods during which the voltages are sensed and correspondingly controlled. In conventional welding, the voltage is typically sensed in one of three ways: Case A) the high-power primary mode only; or alternatively Case B) both the primary mode and the low-power secondary mode. One model of commercial GTA machine welding equipment with AVC capability has the capability to program full period sensing and simultaneous control in either a first pulsing period or a second pulsing period or both, with the voltage being settable for both the first and second pulsing periods. However, it is not known to program this equipment to sense the arc voltage during that second pulsing period when the arc voltage during that second pulsing period is set lower than the arc voltage during the first pulsing period. Other methods, such as electrode and/or filler wire manipulation, have been used instead in the attempt to maintain arc stability (no "climbing"), with adequate side wall wetting. If the arc voltage is sensed only in the primary power mode (Case A), then the arc length is fixed during the secondary power period at the primary power arc length value. If the voltage is sensed both in the primary and secondary power modes (Case B), then the arc lengths are controlled according to the values sensed during their respective periods, relative to the programmed values.

Figure 6:
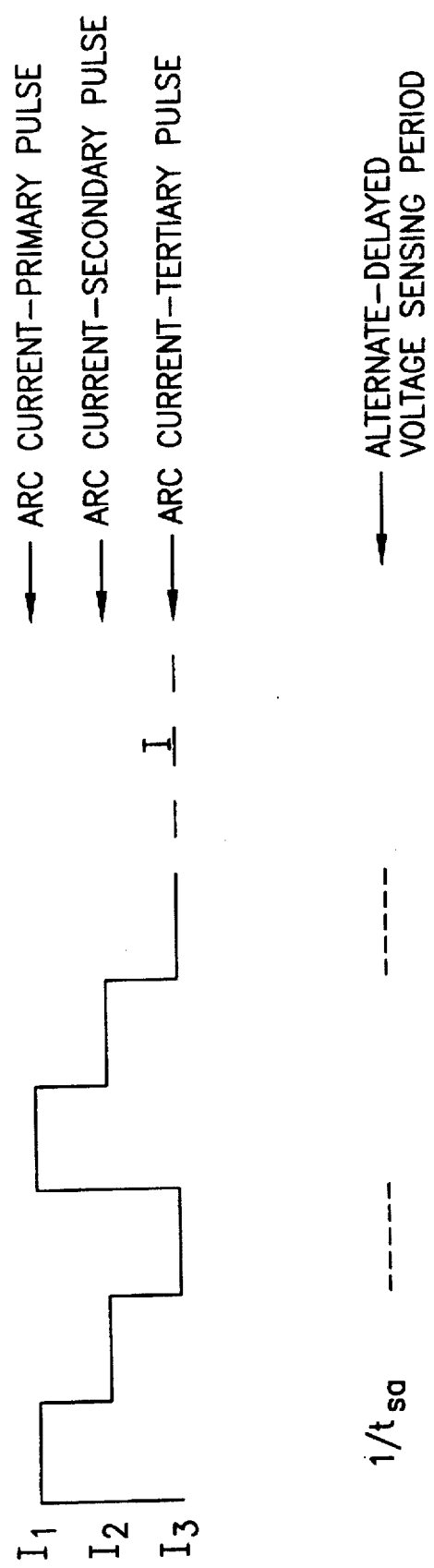
FIG. 6 is a timing diagram showing a basic pulsed welding parameter sequence for the welding voltage control method in accordance with another preferred embodiment of the invention.

The present invention pertains primarily to voltage sensing during the secondary or lowest power mode. Case C1 corresponds to voltage sensing during the secondary power mode of a two-mode pulsing scheme. Case C2 corresponds to voltage sensing during the lowest power mode of a three-mode pulsing scheme such as that depicted in FIG. 6. Alternatively, the order of the pulses could be reversed. An additional configuration disclosed herein, Case D1, consists of either pulsed or continuous welding power, combined with a pilot arc which is used primarily for voltage sensing and control and not for maintaining the weld pool. For pulsed welding power, the pilot arc is established on the same electrode as the welding arc, except at an even lower power than the pulsed secondary power (or lowest welding power level if more than two levels are used). For the welding current configuration identified here as Case D2, the pilot arc may be maintained with a separate electrode which is the master to the arc length of the welding arc, in turn controlling the welding arc voltage through Ohm's Law.

The technical justification for the welding method of the invention is that in all known conventional welding configurations, one or more of the following undesirable conditions exist:

1. The voltage sense period is equal in duration to the time of the corresponding weld power pulse. No priority is given to sensing at the most favorable time of a pulse duration (such as near the end of the low power pulse, when the anode spot is smallest and the arc is least likely to "climb" adjacent side walls).

2. The voltage sense period and the corresponding control period are simultaneous for each power pulse period. Voltage control is not delayed, extended or shifted into a subsequent period, based on a previous period voltage sense value (as may be required if the sensing is delayed to near the end of the previous period).

Figure 5:
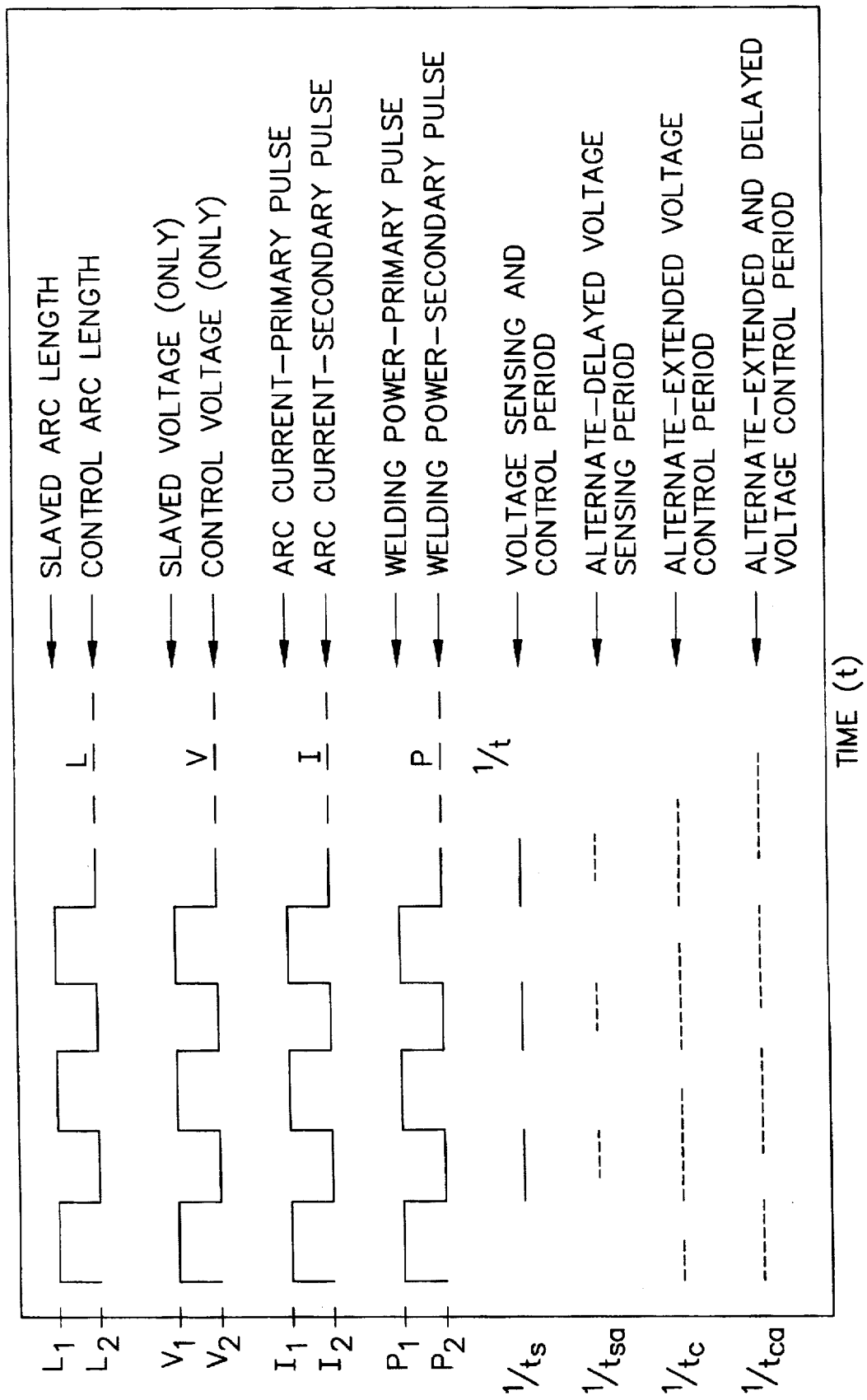
FIG. 5 is a timing diagram showing basic pulsed welding parameter sequences for the welding voltage control method in accordance with the present invention (same designations as in FIG. 4).

For the welding method electrical parameter sequence as shown in FIG. 5, two unique arc length and arc voltage features are identified as follows:

1. The voltage value is sensed only (measured, but not necessarily controlled or responded to) in the low-power secondary period where the power (current and/or voltage) are specifically adjusted so that the arc does not form a large portion, if any, of the anode spot on the side wall(s) of the joint. In this example the joint is chosen as a very narrow groove, having such a small width dimension that the arc would otherwise be subject to "climbing" the joint walls.

2. The corresponding voltage control response of the secondary period (implemented as arc length adjustment) is controlled either during the secondary period or during both the primary (high power) and secondary periods, as desired, depending on the power pulse rate and the system response capability. If the control response proceeds into the next primary period, the control value remains at the value sensed in the prior secondary period as required, but not beyond the next primary period.

Since this method does not utilize the high-power primary period for primary voltage sensing or primary voltage control, the arc therefore cannot "climb" the side wall(s) due to the welding parameters of this period. If the arc length adjustment is performed only during the low-power period and if the low-power period is very short relative to the time required to make the needed change, then in order to maintain sufficient responsiveness to abrupt changes, the gain or "sensitivity" of the control system may be increased, the adjustment period may be extended into the next high-power period (maintaining the low power value), or both. The variation of the relevant welding parameters for conventional methods of pulsed arc welding with AVC and for the method of the invention is shown in Table 1.

As the width of the weld joint is reduced, the clearance between the groove side walls and the shank of the electrode is reduced. If this clearance becomes much less than the distance between the electrode tip and the bottom of the joint, then various methods may be used to maintain resistance to the high-frequency arc starting voltage establishing an arc between the shank and side wall. These other measures can also be used to prevent the current from short-circuiting to the side wall in the event of an inadvertent contact by the electrode.

TABLE 1

LOGIC MATRIX FOR WELDING PARAMETER VARIATIONS OF
PULSED POWER MODES WITH AUTOMATIC VOLTAGE CONTROL

| | Conventional Welding | | Invention | | | |
|---|---|---|---|---|---|---|
| Welding Parameter | Primary Pulse | Secondary Pulse | Primary Pulse | Secondary Pulse | Third Pulse | Pilot Arc |
| Arc Voltage | | | | | | |
| Case A | Variable | Fixed | — | — | — | — |
| Case B | Variable | Variable | — | — | — | — |
| Case C1 | — | — | Fixed | Variable | — | — |
| Case C2 | — | — | Fixed | Fixed | Variable | — |
| Case D1 | — | — | Slaved | Slaved | — | Variable |
| Case D2 | — | — | Slaved | Slaved | — | Variable |
| Case E1 | — | — | Slaved | Variable | — | — |
| Case E2 | — | — | Slaved | Slaved | Variable | — |
| Electrode Position | | | | | | |
| Case A | Variable | Fixed | — | — | — | — |
| Case B | Variable | Variable | — | — | — | — |
| Case C1 | — | — | Fixed | Variable | — | — |
| Case C2 | — | — | Fixed | Fixed | Variable | — |
| Case D1 | — | — | Slaved | Slaved | — | Variable |
| Case D2 | — | — | Slaved | Slaved | — | Variable |
| Case E1 | — | — | Slaved | Variable | — | — |
| Case E2 | — | — | Slaved | Slaved | Variable | — |
| Arc Length | | | | | | |
| Case A | Variable | Fixed | — | — | — | — |
| Case B | Variable | Variable | — | — | — | — |
| Case C1 | — | — | Fixed | Variable | — | — |

TABLE 1-continued

LOGIC MATRIX FOR WELDING PARAMETER VARIATIONS OF
PULSED POWER MODES WITH AUTOMATIC VOLTAGE CONTROL

| Welding Parameter | Conventional Welding | | Invention | | | |
|---|---|---|---|---|---|---|
| | Primary Pulse | Secondary Pulse | Primary Pulse | Secondary Pulse | Third Pulse | Pilot Arc |
| Case C2 | — | — | Fixed | Fixed | Variable | — |
| Case D1 | — | — | Slaved | Slaved | — | Variable |
| Case D2 | — | — | Slaved | Slaved | — | Variable |
| Case E1 | — | — | Slaved | Variable | — | — |
| Case E2 | — | — | Slaved | Slaved | Variable | — |
| Voltage Sensing | | | | | | |
| Case A | On | Off | — | — | — | — |
| Case B | On | On | — | — | — | — |
| Case C1 | — | — | Off | On | — | — |
| Case C2 | — | — | Off | Off | On | — |
| Case D1 | — | — | Off | Off | — | On |
| Case D2 | — | — | Off | Off | — | On |
| Case E1 | — | — | Off | On | — | — |
| Case E2 | — | — | Off | Off | On | — |
| Voltage Control | | | | | | |
| Case A | On | Off | — | — | — | — |
| Case B | On | On | — | — | — | — |
| Case C1 | Off | Off | — | On | — | — |
| Case C2 | — | — | — | Off | On | — |
| Case D1 | — | — | — | — | — | On |
| Case D2 | — | — | — | — | — | On |
| Case E1 | — | — | — | On | — | — |
| Case E2 | — | — | — | Off | On | — |

Each of the following variations of the welding method of the present invention are based on the unique principles that: 1) the arc length and voltage are always sensed and controlled independently of both the primary arc current and arc voltage levels, which form the dominant heating (high-power) mode; and 2) the arc does not require any repetitive electrode tip-to-work lateral relative manipulation to achieve side wall fusion, as is practiced in the industry. All other arc welding methods rely on voltage (rather than arc length) sensing and control that is dependent on: 1) the full periods (rather than the optimum portion) of the primary (or primary and secondary) current level(s), and/or 2) various types of electrode lateral manipulation. These other arc welding methods are therefore susceptible to side wall "climbing", especially in cases such as very narrow grooves where the electrode (and therefore the arc) is in close enough proximity to a side wall to form a portion of the anode spot there. This configuration is called Case C1 herein.

A variation within the base case (voltage sensing only in the secondary period) which will provide even more arc position stability and resistance to "climbing" is a voltage sensing time delay between the beginning of the low-power mode and the beginning of the voltage sensing period. This delay, which may be applied to the base case of sensing and control or any of the major variations disclosed below, allows the larger weld pool generated during the high-power mode to partially solidify and to no longer impinge on the side wall(s) during the sensing period. The length of the sensing time delay is less than the duration of the low-power period. A preferred way to implement the time delay would be to incorporate it electronically as part of a servo controller in the basic control method, or in the following major variations of the base method.

Another variation within the base case is the use of an arc voltage control time extension of the low-power pulse from a given low-power period into the subsequent high-power period, so that if the low voltage sense time is delayed until near the end of the programmed low-power period as preferred, then sufficient time will be available to implement the needed voltage control response.

Major Variations of the Sensing and Control Mode

1. Multi-Level Pulsed Current Mode. The multi-level pulsed current mode consists of three (or more) current levels, one of which is designed and used for voltage sensing (like Case C1 noted above), and provides only a minor heating contribution. The remaining two (or more) levels are used for conventional thermal pulsing purposes. This Case C2 ensures that the sensing period arc width is large enough to sense off of an anode spot of sufficient size to accurately represent the area of interest, but not so large that it would be sensitive to "climbing" the side walls. The remaining low level of current (for thermal pulsing) is chosen for purposes other than for AVC control, such as ensuring that the weld pool has adequately low heat input to cool between the high level pulses, without risk of the arc being extinguished or wandering due to an unstable small size, or risk of weld defects due to insufficient heat input. During the other higher-power pulse periods, the unsensed voltages are dependent on programmed current values (according to Ohm's Law) but not on programmed voltage values, since the arc length for those periods is held approximately constant for all current/voltage combinations.

2. Pulsed Power, Pilot Arc Voltage Sensing Mode. In accordance with the preferred embodiment depicted in FIGS. 3A and 3B, one or more pilot electrode(s) and arc(s) are provided in fixed relationship to the welding electrode. The welding electrode 2 preferably has a non-circular cross section that allows an electrode having a standard cross-sectional area to fit inside a very narrow groove. Weld filler wire 30 is fed under the welding electrode by a filler nozzle 32. Inert gas is supplied into the weld groove via gas inlet 34 and gas cup 36.

Figure 3A:
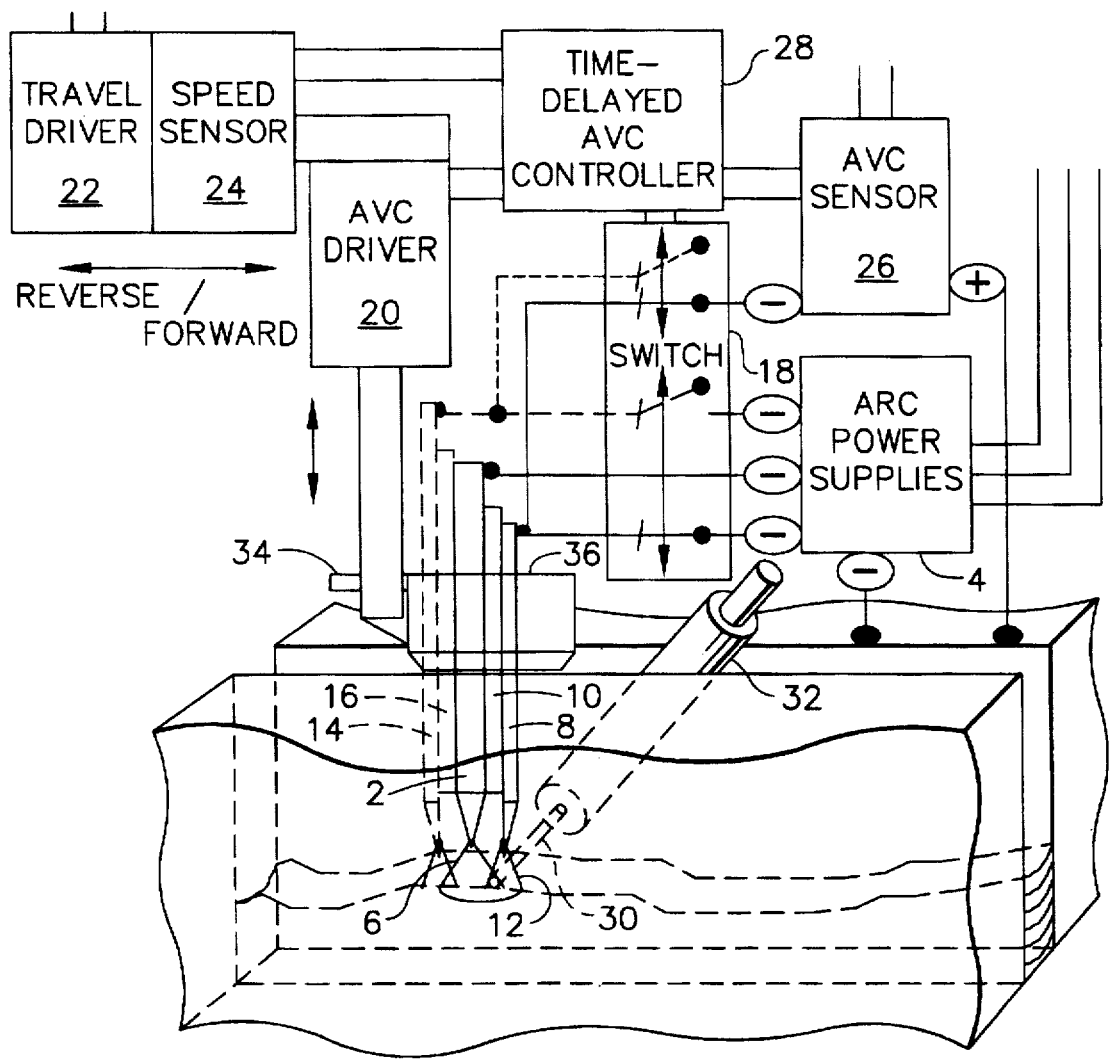
FIG. 3A is a combined schematic and block diagram showing a welding system in accordance with a preferred embodiment of the present invention, using an optional pilot arc with AVC control.
Figure 3B:
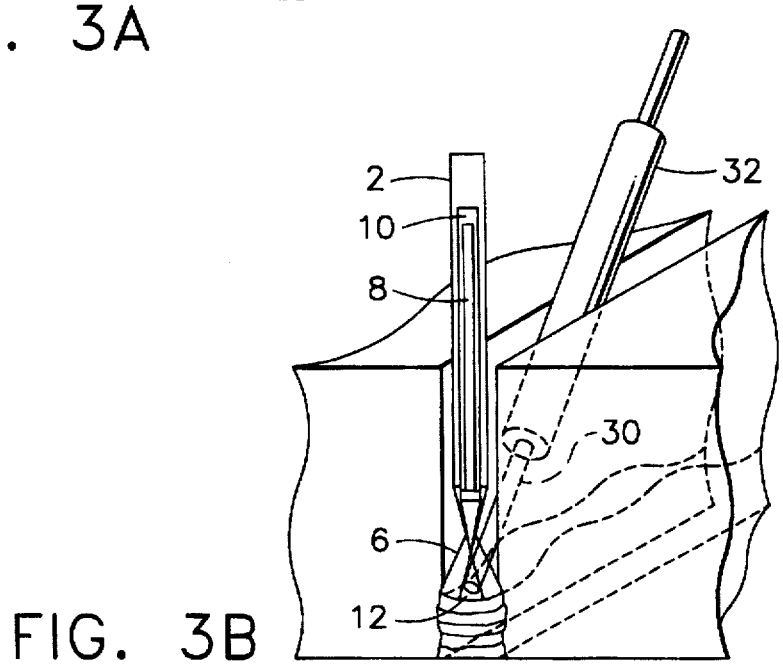
FIG. 3B is a sectional view showing weld material fused in a very narrow weld groove using the welding system shown in FIG. 3A. The torch body is not shown for clarity.

Welding electrode 2 is powered by one of the arc power supplies 4 to produce a primary arc 6. A pilot electrode 8 is mounted on one side of the welding electrode 2 and electrically isolated therefrom by an electrical insulator 10. The pilot electrode 8 is positioned so that during rightward travel (as seen in FIG. 3A) of the welding electrode 2, the pilot arc 12 leads the welding arc 6. Optionally, a second pilot electrode 14 can be mounted on the side of welding electrode 2 opposite to pilot electrode 8 and electrically isolated from welding electrode 2 via insulator 16. The provision of two pilot electrodes on opposite sides of the welding electrode allows bidirectional welding. The pilot electrodes are alternately connected to another of the arc power supplies 4 by controlling switching unit 18 as a function of direction of travel.

Welding electrode 2 (and pilot electrodes mounted thereto) can be displaced vertically by the AVC driver 20. The assembly including AVC driver 20, welding electrode 2 and electrode displacing means (not shown) is displaced by the travel driver 22 in either the forward or reverse travel directions. The speed of travel is detected by speed sensor 24 coupled to travel driver 22.

The pilot arc voltage is detected by the AVC sensor 26, which outputs a signal proportional to the pilot arc voltage to the time-delayed AVC controller 28. The AVC controller 28 controls the AVC driver 20 as a function of the pilot arc length determined from the pilot arc voltage, maintaining the pilot arc length constant, as well as the primary arc length slaved thereto. The control signal to the AVC driver is delayed to compensate for the offset between the welding and pilot electrode positions. The time delay is computed from the travel speed detected by speed sensor 24.

The pilot electrode has the main purpose of maintaining the arc length of the pulsed-power primary arc to which it is positioned nearby, yet operates at a low enough current so that its anode spot is small enough not to be sensitive to arc "climbing." An advantage of this variation is that the pilot arc may be driven by a fixed current level which is chosen independently of the pulsed level heating/cooling considerations. For best voltage and arc length control, the position of the pilot arc is closely slaved to that of the primary arc. An additional benefit of the pilot arc is to condition (preclean/preheat/temper/post-weld heat treat, etc.) the work ahead of and/or behind the main pulsed arc.

For the primary arc, the current may be pulsed according to programmed values. The primary voltage, which is not programmed, will vary according to the preset current and Ohm's Law, since the arc length is controlled by the pilot arc voltage and is independent of the pulsed power. In this mode, the welding electrode position effectively follows (or is slaved to) the lead of the pilot electrode position as controlled by the low-power pilot arc, which in turn follows the contour of the workpiece surface. The benefits of side wall wetting by the weld pool during a high-power mode are thereby maintained, without the risk of arc "climbing" during this time.

The pilot arc voltage sensing mode variation can also be used to advantage with a constant welding power (non-pulsed) condition. In this application, the primary arc length can be made to follow the work surface contour by being slaved to the pilot arc which performs the AVC functions of voltage sensing and control. As preferred, a high degree of side wall wetting by the weld pool can be readily maintained without risk of "climbing" by the primary arc. Very little or no side wall wetting occurs at the anode spot of the pilot arc due to its relatively low power level and corresponding small size.

3. Constant Current, Pulsed Voltage Mode. This variation is utilized when little or no current pulsing (essentially constant current) is required for conventional thermal pulse heating/cooling purposes, but provides for arc width and length control to maintain arc "climbing" insensitivity by variation of the primary and secondary voltage levels. The difference in current levels, if pulsed, may be small enough that the changes in arc size are effectively insignificant, and so alternatively the voltage is pulsed to generate a favorable low-power period, and corresponding small weld pool and anode spot size, for improved voltage sensing. Arc voltage sensing occurs during the preferred low voltage level only, when the arc width and weld pool size are both at reduced values.

During the primary period, the value of the primary arc length is a programmed value which is a percentage or an increment greater than the secondary value, and the corresponding arc voltage will be controlled according to Ohm Law for a constant current. In this mode, the AVC drive command is a fixed value greater than the secondary value and cannot let the arc "climb" during the high power level, since it is not in a self-governing servo mode at this time, but rather an arc length step increase control. In this mode, the electrode position during the primary power pulse effectively follows (or is slaved to) the lead of the electrode position during the secondary pulse, which in turn follows the contour of the workpiece surface. The side wall wetting benefits of a high-power pulse are thereby maintained, without risk of arc "climbing" in this period.

4. Pulsed Current, Pulsed Voltage Mode. This variation is similar to the base case of multi-level current pulsing with constant arc length, except that both the primary and secondary period voltages are pulsed also and are intentionally selected to vary the arc length by causing the electrode to move axially during each pulse, in order to further enhance the arc resistance to side wall "climbing" during the low-current, low-voltage pulses. In these Cases E1 and E2, the voltage is sensed only during the low-power period so that the arc length is shorter, the arc width is narrower, and therefore the anode spot can be controlled so as to not be on the side wall(s) during this period. During the high-power mode, the primary arc voltage is programmed at a value which is incrementally greater than the secondary value (for example, 1 volt more, rather than a preselected value controlled by AVC) and the arc length depends on the programmed level of primary current, according to Ohm's Law. The primary arc voltage, and therefore the primary arc length, is effectively slaved to the programmed secondary voltage value (or lowest control voltage value, if more than two modes are used).

The axial movement of the electrode has been called torch "bouncing" and is typically considered undesirable in conventional practice due to the fact that if a filler wire guide is attached to the torch, then it may not stay aimed at the proper part of the weld pool as it "bounces". One way to manage this potential condition is to mount the filler metal nozzle (and viewing camera, etc.) separately in order to follow an average position of the electrode/torch. For this variation of the invention, controlled "bouncing" of the electrode and arc are the preferred condition.

Minor Variations of the Base Case—Limits on the AVC Response. [Note: As an analogy, these limits on AVC response functionally act like "shock absorbers" and "bumpers" to keep the arc in its preferred position on a weld bead rather than on a side wall if pronounced surface contour irregularities or "bumps" are encountered, or if the "steering" of the electrode displaces the arc from its preferred lateral position.]

1. Provision of a limit on the local axial travel distance of the electrode in the direction parallel to its AVC axis during arc length corrections which maintain the specified arc voltage. This failsafe feature prevents a runaway arc condition from occurring if the weld bead, and therefore the anode spot, momentarily wets the side wall, forcing the secondary arc to mis-position itself there and possibly become susceptible to "climbing" by sensing this abnormal voltage. The limit is controlled as a maximum electrode AVC travel distance per unit of forward travel distance or alternatively, per unit of arc on time (which are directly related for a constant travel speed). As an example, the AVC control would be set not to reposition the electrode in the direction of its axis more than 0.015 inch per each 0.10 inch of forward travel along the weld joint.

2. In addition, to be able to weld over relatively rough surfaces, this local travel limit may be selectively overridden by a voltage change limit and/or voltage rate of change limit when the absolute value of the voltage change (whether positive or negative) exceeds the nominal voltage by more than a programmed percentage. The voltage rate of change limit is referenced to a programmed value which is selected in accordance with the gain of the AVC response circuit.

3. A travel speed and/or speed rate of change (acceleration) limit on the electrode motion in the AVC axis direction during an AVC response, which is referenced to a programmed value selected with respect to the AVC system's circuit gain. Alternatively, a travel time limit may be used to control the total local response of the AVC circuit to minimize or preferably to eliminate arc "climbing" These limits allow AVC-controlled work surface contour following to occur, but prevent the arc and torch runaway condition associated with "climbing".

4. A lateral travel distance limit on the electrode with respect to the centerline of the joint or the programmed path of the weld bead. This limit may be used to override improper torch steering when it positions the electrode and correspondingly the arc close enough to the side walls of the joint to result in the risk of either arc "climbing" or of the electrode short-circuiting to the side wall. The lateral travel distance limit may be implemented mechanically with a torch centering device (such as side wall followers, which can be affixed to a portion of the electrode within the joint or directly to the torch itself). Alternatively, this limit may be triggered by an electrical circuit if the amount of local change (as a function of forward travel distance or time) of the electrode axial position or the rate of change of the electrode axial position exceeds a programmed amount beyond which "climbing" is likely to occur.

TECHNICAL BENEFITS OF THE INVENTION

The technical benefits of being able to weld in a very narrow groove are a reduction in total weld volume, which allows each pass of the weld to be completed with lower heat input, resulting in lower temperatures in the heat affected zone (HAZ), a narrower-width HAZ, and therefore reduced thermal damage to the materials being joined. Typical thermal damage mechanisms for many steels, including those with an austenitic microstructure, are sensitization of the HAZ, large grain growth in the HAZ, and generation of tensile residual stresses in the HAZ, each of which can lead to susceptibility to stress corrosion cracking (SCC) when exposed to an aggressive environment. An additional thermal damage mechanism is local distortion or shrinkage of the component being fabricated. Thermal damage mechanisms for ferritic/martinsitic/pearlitic microstructures include HAZ excessive grain growth, which can lead to losses in cracking resistance, fatigue resistance, and impact toughness, as well as extreme autotempering, which can diminish required hardness and strength properties.

The commercial benefits of the reduced joint width include a great improvement in weld productivity due to the lesser number of passes required to fill the joint, as well as the reduction of potential weld pass restarts and/or repairs which are the result of arc "climbing" and the corresponding interruption of the pass. An additional benefit is a reduction in or elimination of the tedious manual electrode lateral movement (also known as "steering") and the mechanized cross-seam oscillation, both of which would otherwise be required to maintain a stable arc position and full fusion (also known as "tie-in") to the base materials being joined. Steering is the intentional lateral motion of the electrode to compensate for changing conditions near the weld pool, and may be controlled either automatically or manually.

A second significant commercial advantage of the welding method of the present invention is the reduction of the weld volume (due to the uniquely narrow joint width) and therefore the welding time relative to conventional welding methods. As an example, the typical shroud weld volume for 1½-inch-thick base materials and the corresponding welding elapsed time would be reduced by a factor of approximately 3, relative to conventional practice, and by a factor of 1.5, relative to "narrow groove" practice. Conservative welding elapsed-time improvement factors measured on 1¼-inch-thick mockups for these two practices were 2.7 and 1.6, respectively. For operating power plants, the welding elapsed time is expected to be on the critical path of the outage schedule.

Another welding productivity improvement of the welding method resulting from the very narrow joint design is the elimination of the need for tediously controlling lateral weld bead placement, as is normally required for conventional welds with multiple passes in each layer. With very narrow joint designs, the single bead of each layer is preferably centered on the groove width, which may be either preset or maintained automatically during a weld. Typically, only repetitive welding passes applied to the surface of a component (rather than in a groove), such as cladding and overlay, are equipped to have automated lateral bead placement. During conventional groove welding, bead placement is controlled manually by the welding operator.

The welding method of the present invention can be used to significantly improve the efficiency and reliability of various mechanized electric arc welding processes equipped with AVC systems, including but not limited to gas tungsten arc, metal inert gas, flux cored arc, plasma transferred arc, electro-gas and submerged arc processes, and variations thereof. This method is well suited for but not limited to groove welds, and can be applied profitably in any design where the welding electrode must be in close proximity to a conductive surface of the components being joined, such as a fillet weld where the electrode does not bisect the included angle between the adjacent sides of the joint.

Use of the welding method with other mechanized welding joint designs, including "narrow gap/groove" and conventional "V" and "U" groove joints can also result in significant technical and productivity benefits. These benefits are primarily dependent on reducing or eliminating the AVC system's sensitivity to the relative position of the electrode to the side wall, and not on the welding process, the joint width, or the side wall angle while maintaining similar or even enhanced work surface contour following capabilities.

The welding method of the present invention can be effectively used to improve the productivity of welded joints made by conventional manual methods by reducing the weld rejection rate resulting from unacceptable lack-of-fusion defects at the side walls. For thicker materials and large production runs, the cost savings possible with this process due to the reduction in total weld volume can exceed the equipment operation costs, and thereby yield net cost savings. Manual welding productivity and quality can both be improved by upgrading with this mechanized method for applications having limited access restrictions, since the size of many mechanized weld heads can readily be made smaller than the space required to do manual welding.

This welding method, utilizing unique arc sensing and control techniques with mechanized systems, can be used effectively on most weld joint designs to produce nuclear grade weld quality. Due to the uniquely thin joint designs which can be readily welded with the method and the corresponding reductions in welding time, especially for joining thicker section components, the method is most suited for nuclear plant service welding where maintenance of minimum critical path time is of great importance. The greatest benefits can be achieved as a reduction in the width of a given groove weld design, although the benefit of improving the resistance to arc "climbing" of the joint side walls is best realized in the thinnest joints such as the joint shown in FIGS. 2 and 3B.

One potential application is reactor core shroud assembly, repair, or replacement, since the total weld volume is relatively large due to the total weld length, and therefore must be designed to have the smallest value practical. This translates into a weld joint design which is made using the thinnest width that can be reliably welded with high quality. Another application is the control rod drive stub tube-to-stub tube housing attachment weld, since the electrode must be kept close to the housing in order to reach to the bottom of the very narrow groove.

For the shroud and other reactor vessel internal components, both sides of the materials being joined are generally exposed to the potentially aggressive reactor water, making the need for a mechanized welding process with improved SCC resistance even greater for these applications. The welding method of the present invention meets this need by improving the heat input and thermal efficiency of the basic gas tungsten arc and other welding process to be significantly better than any known field-use arc process, including the existing "narrow groove" welding processes.

The foregoing method of arc voltage sensing and electrode position control during mechanized electric arc welding have been disclosed for the purpose of illustration. Variations and modifications of the disclosed method will be readily apparent to practitioners skilled in the art of electric arc welding. All such variations and modifications which do not depart from the concept of the present invention are intended to be encompassed by the claims set forth hereinafter.

I claim:

1. A method of welding in a groove with a welding arc from a welding electrode, comprising the steps of:

melting weld material inside the groove during a cycle using a welding arc, said cycle comprising a first power period and a second power period;

maintaining the arc current at a first current level during said first power period of said cycle and at a second current level during said second power period of said cycle subsequent to said first power period of said cycle, said first current level being greater than said second current level;

sensing the arc voltage during at least a portion of said second power period of said cycle;

adjusting the axial position of the welding electrode, wherein said adjustment of the axial position is a function of said sensed arc voltage of the welding electrode; and melting weld material inside the groove using a welding arc while the welding electrode is in said adjusted axial position.

2. The method as defined in claim 1, wherein said sensing step is performed at a sensing time which is delayed relative to the start of said second power period of said cycle, the duration of the delay being sufficient to allow the weld pool produced during the first power period of said cycle to partially solidify.

3. The method as defined in claim 1, wherein adjustment of the axial position of the welding electrode continues beyond the end of said second power period of said cycle.

4. The method as defined in claim 1, further comprising the step of maintaining a limit on travel of the welding electrode in a predetermined direction.

5. The method as defined in claim 1, further comprising the step of maintaining a limit on change in arc voltage.

6. The method as defined in claim 1, wherein the arc voltage during said first power period of said cycle is programmed at a value which is greater than the arc voltage during said second power period of said cycle by a predetermined amount.

7. The method as defined in claim 1, further comprising the step of maintaining the arc current at a third current level during a third power period of said cycle subsequent to said first power period and prior to said second power period of said cycle, said third current level being greater than said second current level and less than said first current level.

8. A method of welding in a groove with a welding arc, comprising the steps of:

melting weld material inside the groove during a cycle using a welding arc, said cycle comprising first, second and third power periods;

maintaining the arc current at a first current level during said first power period, at a second current level during said second power period, and at a third current level during said third power period, said third current level being less than said second current level and said second current level being less than said first current level; and sensing the arc voltage only during said third power period.

9. A method of welding in a groove with a welding arc from a welding electrode, comprising the steps of:

melting weld material inside the groove during a cycle using a welding arc, said cycle having a first power period and a second power period;

maintaining the arc voltage at a first voltage level during said first power period of said cycle and at a second voltage level during said second power period of said cycle subsequent to said first power period of said cycle, said first voltage level being greater than said second voltage level;

sensing the arc voltage during at least a portion of said second power period of said cycle;

adjusting the axial position of the welding electrode, wherein said adjustment of the axial position is a function of said sensed arc voltage of the welding electrode; and melting weld material inside the groove using a welding arc while the welding electrode is in said adjusted axial position.

10. The method as defined in claim 9, wherein the length of the arc during said second power period of said cycle is maintained at a constant value and the length of the arc during said first power period of said cycle is adjusted to a value which is greater than said constant value by a predetermined amount.

11. The method as defined in claim 9, wherein said sensing step is performed at a sensing time which is delayed relative to the start of said second power period of said cycle, the duration of the delay being sufficient to allow the weld pool produced during the first power period of said cycle to partially solidify.

* * * * *